(No Model.)

LE ROY K. SHERMAN.
SCALE MEASURING ATTACHMENT.

No. 564,342. Patented July 21, 1896.

Witnesses.
Charles G. Sachse
J. H. Pedrick

Inventor
LeRoy K. Sherman
By his Attorney
Wm Zimmerman.

THE NORRIS PETERS CO., PHOTO-LITHO., WASHINGTON, D. C.

UNITED STATES PATENT OFFICE.

LE ROY K. SHERMAN, OF CHICAGO, ILLINOIS.

SCALE MEASURING ATTACHMENT.

SPECIFICATION forming part of Letters Patent No. 564,342, dated July 21, 1896.

Application filed November 9, 1895. Serial No. 568,384. (No model.)

*To all whom it may concern:*

Be it known that I, LE ROY K. SHERMAN, a citizen of the United States, residing at Chicago, in the county of Cook and State of Illinois, have invented certain new and useful Improvements in Attachments for Measuring-Scales, which are fully set forth in the following specification, reference being had to the accompanying drawings, forming a part hereof, in which—

Figure 1:
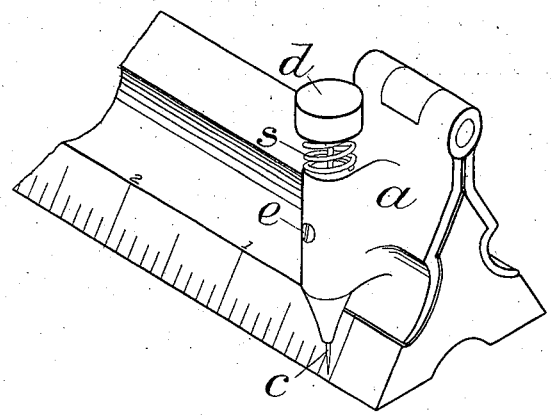
Figure 3:
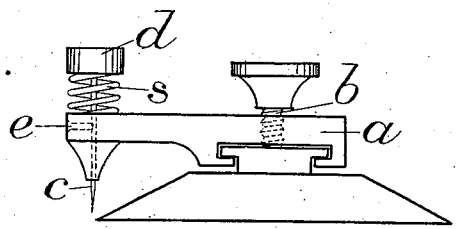
Figure 2:
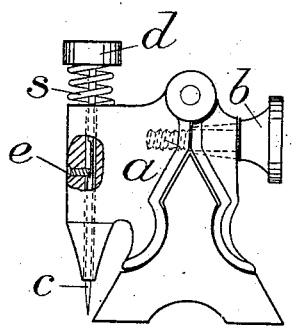
Figure 4:
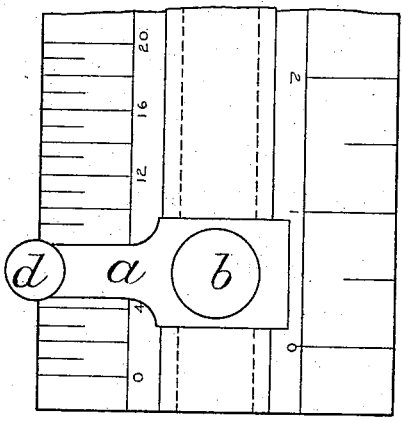

Figure 1 shows a part of a scale with my said device attached to one end of it. Fig. 2 shows an end view of Fig. 1 with a fragment broken away to show an interior construction. Fig. 3 shows a modification of construction as applied to flat scales. Fig. 4 shows Fig. 3 in plan view.

Like letters of reference denote like parts.

The object of my invention is to produce a device for pricking the points measured by a draftman's scale in a more expeditious as well as more accurate way than has heretofore been done. To attain said desirable ends, I construct my said new device in substantially the following manner, namely:

I make an adjustable clamp to fit over the upper sides of the common triangular scale, and to flat scales I attach a piece of such form as will receive a modified form of my said clamp. In the drawings the clamp attached to the two first figures is formed of two legs, which are hinged at their top and between said top or hinge and the upper edge of the scale provided with a shouldered and mill-headed bolt with threads in one of the legs and the legs formed to fit the sides of the scale.

The side of the clamp $a$ which is threaded has a projection with an upper and lower horizontal plane and vertical hole, through which passes a pricking-pin $c$ with a large flat head $d$, and between said head and upper plane is a spring $s$, coiled around said pin and pressing under said head and on said upper surface. Said pin is also provided with a notch or shoulders upon which works a pin or stop $e$, and so checks the motion of the pin in either direction. The screw $b$ may either attach the device fixedly or so that it may be made to slide from place to place by the application of more or less force.

The T-shaped piece attached to the top of the flat scale shown in Figs. 3 and 4 receives under its head the lugs which correspond to the legs shown in Figs. 1 and 2. The binding-screw $b$ in each case operates in substantially the same way, and the projection, its pin, and attachments therefor are identical, although they are slightly different in form. The point of the pin is brought in close proximity with the edge of the scale.

From what has been said the operation of the device is obvious. The point to be measured from may be set to a fractional part on the scale and the distance taken from the desired unit-mark, which will prove to be very convenient and rapid where a series of points are to be measured, as well as very accurate. In the other way the pin is moved from place to place.

What I claim is—

1. The combination with a scale with divisions thereon in, or near, contact with the paper provided with a fixed part above said scale-divisions of a form adapted to receive thereon an adjustable part, of a clamp provided with a projection with a vertical reciprocating pin with point in close proximity to the edge of the scale, a head to said pin and a lifting-spring thereto, substantially as specified.

2. The combination with a scale with divisions thereon in, or near, contact with the paper provided with a fixed part above said scale-divisions of a form adapted to receive and clamp thereto an adjustable part, of a clamp provided with a projection with a vertical reciprocating pin with point in close proximity to the edge of the scale, a head to said pin and a lifting-spring thereto, a notch in said pin and a stop in said notch, substantially as specified.

LE ROY K. SHERMAN.

Witnesses:
P. H. FLEMING,
EDWARD J. MURPHY.